Dec. 20, 1938.                O. P. HAEGELE                2,140,796
                             WEIGHING APPARATUS
                            Filed Aug. 2, 1935            2 Sheets-Sheet 2

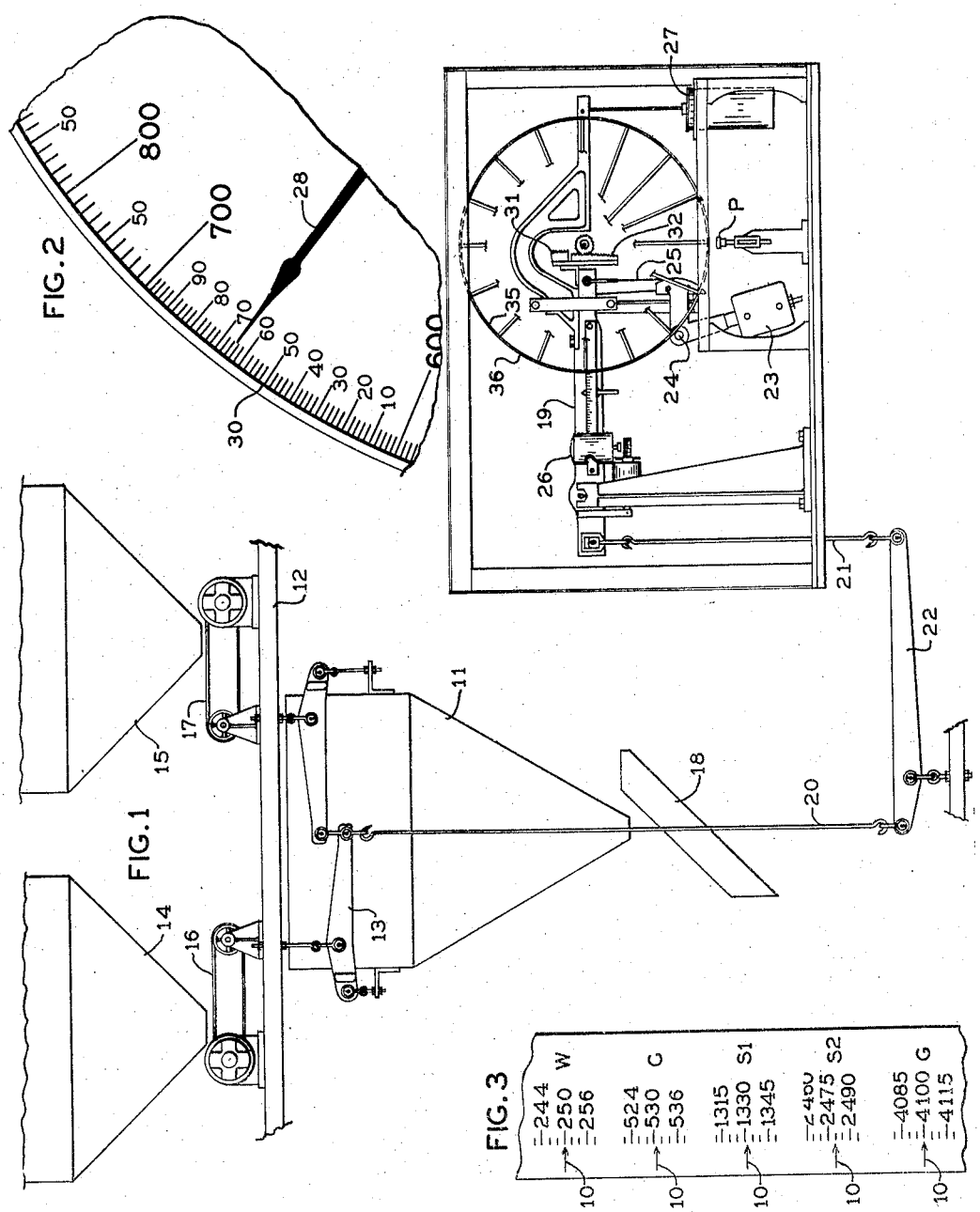

INVENTOR
OTTO P. HAEGELE
BY Roland C. Rehm
ATTORNEY

Patented Dec. 20, 1938

2,140,796

UNITED STATES PATENT OFFICE 2,140,796

WEIGHING APPARATUS

Otto P. Haegele, Chicago, Ill., assignor to Streeter-Amet Company, Chicago, Ill., a corporation of Illinois Application August 2, 1935, Serial No. 34,419

6 Claims. (Cl. 265—27)

This invention relates to weighing apparatus and, among other objects, aims to provide improved weighing apparatus designed, for example, to weigh a succession of materials comprising a batch.

The invention may be readily understood by reference to one illustrative apparatus embodying the invention, which apparatus is shown in the accompanying drawings.

In said drawings:

Fig. 1 is an elevation, somewhat diagrammatic in character, of a batching scale together with recording apparatus therefor;

Fig. 2 is an elevation of a portion of the dial of the scale showing different graduation ratios at different portions of the dial;

Fig. 3 illustrates a typical record tape of the weights of a succession of ingredients comprising a given batch;

Figure 8:
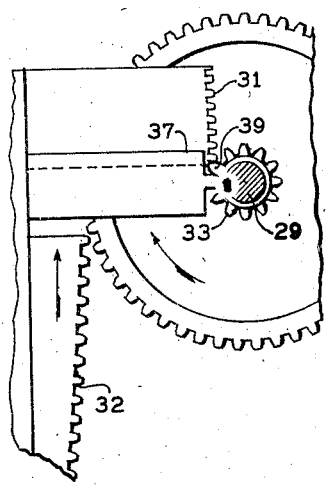
Fig. 8 is a side elevation taken from the left-hand side of the rack bar, i. e. from the plane 8—8 of Fig. 6, and showing the high ratio rack and pinion operated thereby.
Figure 6:
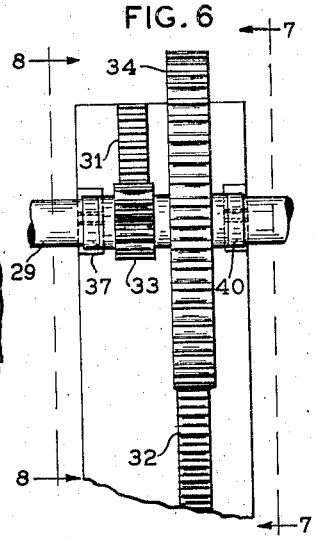
Fig. 6 is a front elevation of the rack bar and the pinions operated thereby.

The invention is here shown embodied in a scale such as a batching scale wherein a plurality of materials comprising a single batch are successively weighed. Because of the possible wide differences in the proportions of ingredients comprising a given batch, a scale which will give sufficiently close weight indications or records for an ingredient which comprises a large proportion of the batch, may not give sufficiently close indications for another ingredient which comprises only a small proportion of the batch. For example, in Portland cement concrete, the water and the cement each comprise a relatively small proportion of the total weight, whereas the coarse aggregates comprise a large proportion thereof. Hence a scale designed to give a proper indication or record of the weight of the coarse aggregates cannot readily be adapted to indicate or record the weight of the smaller ingredients sufficiently closely. For example, if the scale multiple were designed to indicate the weight of the heavy aggregates to increments or "units" not greater than 2% of the weight, the design would not be such as to indicate the weight of the lighter ingredients closely enough. Indeed, as regards concrete, specifications generally require that in weighing water and cement the weight should be indicated or recorded to within 1% of the weight. On the other hand, a scale designed with a low multiple to record the weights of the small ingredients within the necessary tolerances, would not have an adequate capacity for an entire batch of materials including the heavier ingredients.

While the foregoing difficulties might be solved by the use of capacity or drop weights, the manual attention thus made necessary would render the apparatus impractical. Therefore, it has been the practice heretofore to use separate weigh beams or other weight responsive devices of different ratios or multiples for each ingredient or for the smaller or heavier ingredients, designed to give adequately close weight indications or readings. The illustrative apparatus employs only a single weigh beam or weight responsive device and is designed to indicate and record the weights of a series of ingredients comprising widely varying proportions of the total weight of the batch. As one example of the utility of the apparatus, Fig. 3 illustrates a typical record (in this case a tape) on which is printed the weights of the succession of ingredients comprising a batch of concrete. As is evident from the tape, the water has first been added to the scale and its weight together with its identifying symbol "W" has first been printed upon the tape. Water being one of the small ingredients in concrete which must be weighed within close limits for reasons well understood in the art, its weight is recorded in units of six pounds with intermediate graduations of two pounds, making interpolation to single pounds or fractions of pounds easily possible. Even without interpolation, the weight graduations record the weight within substantially less than 1% of the weight. The cement being also one of the smaller ingredients, is next added to the scale and the total weight of the water and cement is recorded on the tape together with the identifying letter C for cement. This weight as shown by the index 10 is between 530 and 532 pounds, the weight of the cement obviously being the difference between the weight of the water and the total. Its weight is also recorded in increments of less than 1% of the weight of the cement.

The aggregates, such as fine and coarse sand S1 and S2 respectively and the coarse aggregate G are then successively added and the cumulative weights successively printed as shown. The weights of the aggregates which comprise by far the greater proportion of the concrete, are printed in increments of fifteen pounds with intermediate graduations of five pounds. For example, the cumulative weight after the addition of the fine sand S1 is between the printed weights 1330 and 1345, the weight of the fine sand being the difference between the adjacent weight indications, namely, approximately 800 pounds. Thus it is apparent that the increments or "units" of printed weight on the record are within 2% of the weight; and if an interpolation of the position of the index between adjacent printed numbers be made, the increments of weight will be much less than 2% of the weight. The same applies for the other aggregates.

As will presently appear, the foregoing results are obtained by employing a plurality of ratios of multiplication between the scale and the recording and indicating devices. Two ratios are satisfactory in the case of concrete since as regards the accuracy of weight, the ingredients fall into only two classes.

As here shown, the material receiving portion of the scale is represented by a hopper 11 supported from the structure 12 by a conventional system of scale levers 13 whose details form no part of the present invention. The solid materials may be supplied in any convenient manner. As here shown, they are supplied from a series of hoppers 14, 15 etc. discharging on traveling belts 16 and 17 which convey the ingredients into the weigh hopper 11. The details of the supply of predetermined weights of ingredients to the weigh hopper are shown in my co-pending application Serial No. 10,038 and need not again be described here.

If desired, the weigh hopper 11 may be divided into a plurality of compartments into which the separate materials are discharged so as to prevent premature mixing of the materials.

After all the ingredients have been successively added to the weigh hopper and the weights successively indicated and/or recorded, the hopper may be discharged by any convenient means such as shown in my co-pending application and its contents carried by appropriate conveying means such as the chute 18, to any appropriate point. If these comprise concrete materials, they are preferably discharged into an appropriate concrete mixer.

The scale load is transmitted to the weight responsive member, in the present case the weigh beam 19, through tension elements or beam rods 20 and 21 and intervening lever 22. The weigh beam is automatically counterbalanced by any appropriate means such for example as the pendulum 23 pivoted at 24 and connected to the beam by a flexible tension element 25. The details of the counterbalancing means are conventional and form no part of this invention. Thus the beam is made responsive to the load on the scale and is moved by the load to a position which represents the weight of the load. Carried on the beam is the usual tare poise 26; and a dashpot 27 of conventional form is shown connected to the beam.

The load on the scale is indicated on dial 30 by a pointer 28 carried on dial shaft 29. The dial shaft is rotated by a multiple ratio rack actuated by the weigh beam. In the present instance the rack is formed in two curved rack sections 31 and 32 which respectively and successively operate high and low ratio pinions 33 and 34 carried on shaft 29. The high ratio rack functions to control the dial pointer 28 during that portion of the scale loads which represent the smaller ingredients, its function being to rotate the shaft and dial pointer through a relatively large angle for a given increment of movement of the beam. The portion of the capacity of the scale during which the high ratio rack functions is determined by the relation between the total weight of the smaller ingredients and the total weight of the batch. In the present illustration for concrete, the total weight of the smaller ingredients, i. e. water and concrete, never exceeds 700 pounds, hence the high ratio rack 31 is constructed and arranged to control the shaft 29 from zero to 700 pounds load. This represents a relatively larger proportion of the dial 30 than would be the case if a single ratio rack were employed and it permits the subdivision of this proportion of the dial into relatively fine graduations, in this case one graduation for each two pounds of weight, making interpolation to single pounds and fractions of pounds easily possible if desired.

For the balance of the scale capacity, namely beyond 700 pounds, the dial shaft 29 is under the control of low ratio rack 32, the result being that the angular movement of the dial shaft and pointer 28 is much less for a given increment movement of the scale beam than when under the control of the high ratio rack 31. This makes it possible for the scale to have an adequate capacity for all the materials comprising the batch. As indicated in Fig. 2, the smaller angular increments of movement of the shaft 29 and its pointer are represented by the dial graduations from 700 pounds up. These graduations may, without being excessively fine, represent increments or "units" of ten pounds.

Carried on shaft 29 is a conventional printing wheel 35 carrying on its periphery 36 printing type by which the records on the tape shown in Fig. 3 are printed. The printing tape while it need not necessarily have the same graduations as appear on the dial 30, should of course be designed as shown with high and low ratio graduations corresponding in angular position to the dial. In other words, from zero to 700 pounds the type wheel graduations have a high ratio and from 700 pounds up have a low ratio. The graduations and number increments on the dial and the printing wheel need not be and are not, in the present case, the same. The graduations and numbers on the printing wheel are designed to insure a proper and legible record; whereas those on the dial are determined largely by consideration of visibility.

The printing mechanism P by which the record tape or other record is impressed on the printing wheel in printing position is conventional in character and may if desired be of the character shown in my co-pending application. Preferably printing means are also provided for printing on the tape other data such as the symbols representing the ingredients, the time of discharge of successive batches etc. The details of such mechanism are conventional and need not be disclosed.

Figure 7:
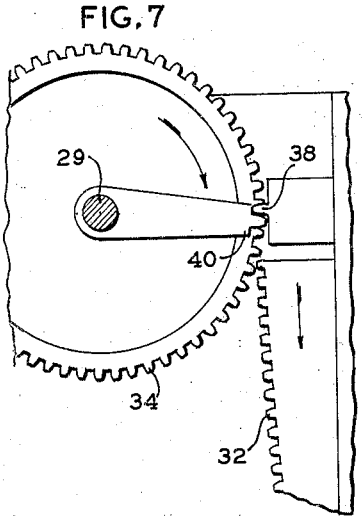
Fig. 7 is an elevation of the right-hand side of the rack bar and pinions, taken from the plane 7—7 of Fig. 6 and showing the low ratio pinion and its rack.
Figure 4:
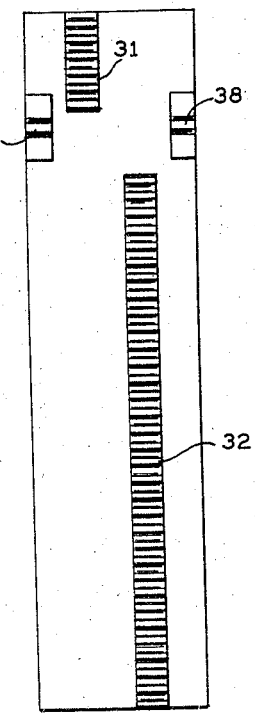
Figs. 4 and 5 are respectively front and side elevations of a double ratio rack bar used in conjunction with the weight indicating and recording mechanism.
Figure 5:
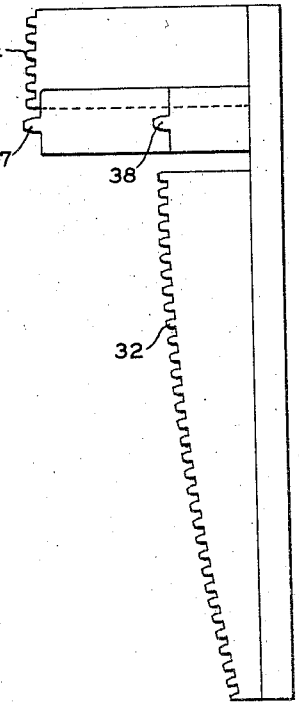

To prevent a disturbance in the relation of the racks 31 and 32 to the shaft 29, such as might occur as the actuation of the shaft was transferred from the control of one pinion to the other, means are provided for supplementing the control of the shaft at such point. Such means are here shown in the form of single tooth racks 37 and 38 controlling respectively single tooth pinions 39 and 40. As shown in Figs. 7 and 8, these are located at the point of change in ratio. For example, as the high ratio rack 31 is about to leave its pinion and pinion 34 is about to mesh with the low ratio rack 32, the single tooth pinion 40 engages the tooth on rack 38 and prevents any slight independent rotation of shaft 29 such as might prevent the teeth on pinion 34 from meshing absolutely accurately with the teeth in rack 32.

In traveling in the other direction, namely when shaft 29 is about to come under the control of the high ratio rack, the single tooth rack and pinion 37 and 39 respectively prevent any slight rotation of the shaft independently of rack 31 such as might prevent the teeth of pinion 33 from meshing accurately with those of rack 31.

It is thus possible to effect a transfer of the control of shaft 29 from one speed or ratio of rotation to that of the other without the possibility of a disturbance or maladjustment in the relation between the beam and the indicating and recording mechanism and without attempting to control the shaft 29 and both the high and low ratio racks at the same time. It should be remembered that at the point of transition an abrupt change in the speed of rotation of shaft 29 and the type wheel occurs. This would make it exceedingly difficult without the supplementary single tooth racks and pinions to provide a freely operating rack and pinion mechanism without the danger of a slight independent rotation of the shaft 29 (because of the inertia set up by the change in rate of rotation) such as might result in causing the tooth of a pinion to engage with the end of a rack tooth instead of between two teeth. Some slight clearance between rack and pinion is necessary to avoid friction and secure a freely operating mechanism and this clearance would ordinarily be sufficient to create the possibility of faulty operation at the point of transition from one rack to the other.

It should be noted that while the teeth on the single tooth racks and pinions above referred to are somewhat larger than the teeth of the other racks and pinions, the pitch lines of the respective teeth are the same as that of the racks and pinions with which they cooperate. In other words, the pitch line of the single tooth on rack 37 is the same as that on rack 31 and the pitch line of the single tooth on pinion 39 is the same as that on pinion 33. By making the single teeth relatively larger, the interval during which the shaft 29 is under the control of the single tooth is extended so as to insure accurate meshing of the succeeding racks and pinions beyond the point of transition and also to insure that the preceding racks and pinions have fully unmeshed before the succeeding and meshing takes place.

Ordinarily a different design of rack ratios is not necessary for different installations or different scale capacities, it being simply necessary in calibrating the scale to adjust the printing wheel and dial pointer to coincide with the point of transition from one ratio to another at the instant the rack and pinions are at such point of transition. Such point may occur at any desired point in the capacity of the scale, depending on the ingredients weighed. The dial and printing wheel graduations must of course be designed to conform therewith. The lengths of the high and low ratio racks may be made sufficiently long to permit their use with any desired subdivision of the scale capacity into low and high ratio weight indications. Redesign of the racks and pinions is necessary only where different relative ratios are desired. The arrangement thus adapts the apparatus to a wide variety of conditions simply by simple adjustments during the calibration or "sealing" of the scale.

Obviously the invention is not limited to the details of the illustrative embodiments herein shown and described, since these may be variously modified. Moreover, it is not indispensable that all features of the invention be used conjointly since various features may be used to advantage in different combinations and subcombinations.

Having described my invention, I claim:

1. Weighing apparatus of the character described comprising in combination a weight indicating member movable to a position to indicate the weight of the load, scale mechanism including a pair of successively acting racks and a pair of pinions of different ratios for controlling the movement of said weight indicating member, and supplementary rack and pinion elements for controlling the weight indicating member at the point of transition of control from one rack to the other.

2. Weighing apparatus of the character described comprising in combination a load receiver, weight indicating means adapted to be moved to a position representing the weight of the load, mechanism for operating said weight indicating means and including a pair of successively acting racks and pinions of different ratios, said racks being arranged so that one pinion leaves the control of its rack before operative engagement of the other rack and pinion, and supplementary elements for preventing relative displacement of said weight indicating member and said scale mechanism during the transition of control from one rack to the other.

3. Weighing apparatus of the character described comprising in combination a weight indicating member movable to a position to indicate the weight of the load, scale mechanism including a pair of successively acting racks and a pair of pinions of different ratios for controlling the movement of said weight indicating member, said racks being arranged so that one pinion leaves the control of the rack before operative engagement of the other rack and pinion, and supplementary elements for preventing relative displacement of said weight indicating member and said scale mechanism during the transition of control from one rack to the other.

4. Weighing apparatus of the character described comprising in combination a weight indicating member movable to a position to indicate the weight of the load, scale mechanism including a pair of successively acting racks and a pair of pinions of different ratios for controlling the movement of said weight indicating member, and separate cooperating pairs of single rack and pinion teeth operative for insuring free movement and for preventing lost motion at the point of transition of control from one rack to the next.

5. Weighing apparatus of the character described comprising in combination a scale mechanism having a capacity adequate for weighing a series of cumulatively added substances comprising a batch of materials, one of which substances represents a relatively small proportion of the entire batch, a weighing receiver for holding all of the substances comprising the batch, a dial and pointer for indicating the weight of the load, said scale mechanism including a pair of successively acting racks and pinions of different ratios for operating said pointer, said racks being relatively arranged so that one operatively terminates before the other assumes control, and pairs of supplementary single rack and pinion teeth controlling said pointer for preventing lost motion at the point of transition from one rack to the other, said dial having graduations thereon corresponding to the ratios of movement of said pointer.

6. Apparatus for weighing successively added components comprising a batch of materials, some of which components comprise a relatively small proportion of the entire batch, comprising in combination scale mechanism including a material receiver adapted to receive the successive components as they are added to the scale, a weight responsive member adapted to be moved by the load to a position representing the weight of the load, weight indicating means operated by said weight responsive member, means comprising a pair of successively operating racks and pinions of different ratios for automatically changing the ratio of movement between said weight responsive member and said pointer whereby the lighter components of the batch effect a greater relative movement of said pointer than the heavier components, said weight indicating means graduated to correspond to the different ratios of movement, and supplementary rack and pinion elements for controlling the pointer at the point of transition from one rack to the other to insure free movement and prevent lost motion.

OTTO P. HAEGELE.